(12) United States Patent
Bingeman

(10) Patent No.: US 8,258,220 B2
(45) Date of Patent: Sep. 4, 2012

(54) COMPOSITION AND METHOD

(75) Inventor: Ronald E. Bingeman, Brookhaven, PA (US)

(73) Assignee: Uniqema Americas LLC, Wilmington, DE (US)

( * ) Notice: Subject to any disclaimer, the term of this patent is extended or adjusted under 35 U.S.C. 154(b) by 227 days.

(21) Appl. No.: 12/448,475

(22) PCT Filed: Dec. 20, 2007

(86) PCT No.: PCT/US2007/026092
§ 371 (c)(1),
(2), (4) Date: Nov. 20, 2009

(87) PCT Pub. No.: WO2008/079304
PCT Pub. Date: Jan. 3, 2008

(65) Prior Publication Data
US 2010/0105803 A1    Apr. 29, 2010

Related U.S. Application Data

(60) Provisional application No. 60/876,135, filed on Dec. 21, 2006, provisional application No. 60/924,194, filed on May 3, 2007.

(51) Int. Cl.
*C08K 5/10*    (2006.01)
(52) U.S. Cl. ........ 524/287; 524/311; 524/312; 524/313; 524/322
(58) Field of Classification Search ................... 524/287, 524/322, 311, 312, 313
See application file for complete search history.

(56) References Cited

U.S. PATENT DOCUMENTS

| 6,139,623 A | 10/2000 | Darwin et al. |
| 2005/0037933 A1 | 2/2005 | Bingeman |

OTHER PUBLICATIONS

International Search Report dated Apr. 24, 2008 for PCT/US2007/026092.

*Primary Examiner* — Kriellion Sanders
(74) *Attorney, Agent, or Firm* — Jones Day

(57) ABSTRACT

A composition has a water dispersible esterified trimer acid (ETA) and a block co-polymer, especially a polyoxyalkylene block copolymer having EO and PO blocks. The composition may also have a polymeric surfactant antifoaming agent and an oil (especially a mineral oil or ester oil).

32 Claims, No Drawings

COMPOSITION AND METHOD

CROSS REFERENCE TO RELATED APPLICATIONS

This application is the National Phase of International Application No. PCT/US2007/026092, filed Dec. 20, 2007, and published in English, and which further claims the benefit of U.S. Provisional Patent Application No. 60/876,135, filed Dec. 21, 2006, and U.S. Provisional Patent Application No. 60/924,194, filed May 3, 2007. These applications, in their entirety, are incorporated herein by reference.

FIELD OF INVENTION

The present invention relates to compositions comprising a water-dispersible esterified trimer acid and block copolymer and to compositions comprising a water dispersible esterified trimer acid, block copolymer and polymeric surfactant antifoaming agent. More particularly the invention relates to compositions which are suitable for use as metal working fluids. The combination of water dispersible esterified trimer acid and block copolymers results in a synergetic relationship to produce improvements in metal working performance and the combination of water dispersible esterified trimer acid, block copolymer and polymeric surfactant results in improvements in metal working performance. The present invention also provides methods of making such compositions and methods of using them.

BACKGROUND TO INVENTION

Metal working fluids are used in machining and working operations of metals, where they serve to reduce friction, improve cooling, reduce corrosion, reduce wear, or otherwise improve the machining process. Typical metal working processes in which metal working fluids are often used include cutting, drilling, tapping, grinding, milling, turning, punching, stamping, rolling and like operations.

Metal working fluids are available in synthetic, semi-synthetic and soluble oil forms. Synthetic systems comprise aqueous dispersions of components to act as lubricating agents, corrosion inhibitors, anti-foaming agents and the like. They typically comprise less than 5% w/w mineral oils or related oils. Semi-synthetic systems comprise emulsions of oils, e.g. mineral oils, in aqueous solutions of emulsifying agents. The oil is highly dispersed in the aqueous system through the action of the surfactants. Typically, semi-synthetic metal working fluids contain from 5 to 40% w/w mineral oil. Soluble oil metal working fluids typically contain more than 40% w/w oil and often contain little or no water. Soluble oil fluids are preferred to synthetic forms in many circumstances because of their better cutting performance.

Metal working fluids are usually supplied as a concentrate and then diluted in water before being used. Additional additives such as corrosion inhibitors will also routinely be added to the concentrate or the final product formulations. Block copolymers (BCP), and in particular reverse block co-polymers (RBCP), are well known for use in metal working fluids, where they act as lubricants and often as surfactants. They are used in fluids for the working of steel, aluminium and many other alloys and metals. Typically RBCP containing compositions are provided as a water-based/water-dilutable concentrate. Though RBCP-based compositions tend to perform adequately in machining of steel, they are known to perform poorly in machining of aluminium. There is a need in the industry for improved compositions for use in metal working fluids, which perform well when working aluminium, and other light weight metals. This is apparent from the recent increases in the industrial use of aluminium and other light weight metals and alloys, which have become as important as, if not more important than, the use of steel. There is an even greater need for metal working fluids which are effective in working both steel and aluminium, and preferably other metals and alloys.

There is also a desire in industry for compositions which allow the user to view the workpiece while the metal working fluid is being applied. This requires that the metal working fluid is relatively transparent or translucent. In synthetic or semi-synthetic metal working fluids it is extremely difficult to achieve optimum cutting performance in such a metal working fluid. This is due to the fact that typically the metal working fluid clarity is inversely proportional to the cutting efficiency, whereby coarse, opaque, large particle size fluids outperform small particle size clear fluids.

In the case of RBCPs, fluid clarity or translucency is, at least in part, dependent upon the cloud point temperature of a material. Cloud point temperature is the temperature at which cloudiness becomes apparent in a liquid as the temperature is raised; i.e., the temperature at which turbidity is first noted in a liquid. Usually this is the result of the separation of the solute from water in a reaction mixture. It has been standard practice to market copolymer-containing metal working fluid concentrates that separate into two or more phases at elevated storage temperatures, these temperatures are often around 50° C. This separation is the result of the low cloud point temperatures of RBCP. Typically RBCP containing compositions have cloud point temperatures of from around 25 to 35° C.

Polyalkylene glycols in general, and RBCPs in particular, tend to phase separate and become concentrated at the hot tool/workpiece interface during the metal working process; these localised concentrations of RBCP generally provide excellent lubrication in steel metal working operations, but less so in aluminium. It is known that RBCPs exhibit polar attractions between their polyalkylene glycols and many metal surfaces, and this may account for some aspects of their performance as metal working fluids. Clouding out at the tool/workpiece interface is less of a problem in terms of visibility than a generally opaque composition.

It would be highly desirable to have an RBCP-containing formulation that retains its lubricity and does not separate as readily as known systems. However, given the highly effective nature of RBCPs for metal working, this stability deficiency has been tolerated in industry.

It would also be highly desirable to have more effective metal working fluids. In particular, this is a longstanding issue in aluminium working, where current systems generally perform very poorly.

The use of esters, partial esters and complex ester compositions are also known to be used in synthetic metal working fluid systems. These ester ingredients can provide desirable properties, such as better bio-stability, meaning the formulation is resistant to microbial contamination thus helping to extend the shelf life of the system. Metal working fluids are today being applied to metal workpieces with increasing velocity to maximize heat rejection during the processing operations. At the same time, sump sizes are getting smaller to minimize space and fluid inventory. With both of these features, foaming is becoming increasingly problematic, as foamed fluid is known to cause overflow problems with the sump. So it would be highly desirable to minimize the propensity to form foam in use. Furthermore low foaming is desired to ensure maximum contact between the tool and workpiece surface.

Traditionally, the processing of aluminium workpieces using synthetic or semi-synthetic metal working fluids results in partial darkening or staining of the workpieces as a result of oxidation and residual impurities on the workpieces. This darkening or staining negatively impacts further processing as the aluminium parts need to be cleaned in steps following the metal working, which adds cost to the machining process. Avoiding this staining in the first place would minimize or eliminate the additional processing steps, thereby increasing throughput and minimizing overall costs of the machining operation.

An effective metal working fluid desirably combines a number of properties to be suitable for a specific application. These properties commonly include lubricity, effective cooling, bio-stability, low foaming to ensure maximum contact between tool and workpiece surface, emulsion clarity to allow operators a clear view of workpiece and lack of surface darkness or staining when the workpiece is aluminium. Compositions which can maximise one or preferably several, of these properties are desired. Additionally, the storage and viscosity properties of the metal working fluid concentrate are important for ease of handling and formulation.

SUMMARY OF INVENTION

According to a first aspect of the present invention there is provided a composition comprising a water dispersible esterified trimer acid (ETA) and a block co-polymer.

According to a second aspect of the present invention there is provided a composition comprising a water dispersible esterified trimer acid (ETA), a block co-polymer and a polymeric surfactant antifoaming agent which maximises several of the above mentioned properties for an effective metal working fluid. An oil (especially a mineral oil or ester oil) may also be present in the composition.

Compositions according to the present invention are particularly suitable for use in metal working fluids. "Metal working fluid" in the present application refers to fluids which are suitable for processes such as drilling, tapping, turning, milling, grinding, punching, deep drawing, stamping, cutting, rolling and like operations.

ETAs are known to be useful in specific metal working fluid systems. They provide desirable properties, such as bio-stability, and can be disposed of using standard techniques. ETAs are derived from trimer acids, which, depending on the specific derivative, can be water immiscible or water dispersible. Water dispersible ETAs, for example, are useful in synthetic systems, whereas water immiscible ETAs (oil soluble) are ineffective in synthetic systems but useful in soluble oil systems.

Water immiscible ETAs are fully or nearly fully esterified with alkyl alcohols whereas water dispersible ETAs are partially esterified with alkylalkoxy alcohols only or in combination with alkyl alcohols but retain sufficient residual carboxylic acid groups which, when neutralised, render the derivatives water dispersible.

The different types of ETA's are used individually in different formulations depending on the type of emulsion desired. For example, U.S. Pat. No. 6,060,438 discloses the use of water immiscible ETAs, such as Priolube 3953 (TM, ex. Croda Uniqema Inc., Delaware) for use in semi-synthetic oil-in-water emulsions. While such semi-synthetic systems are reported as having improved lubricity, bio-stability and reduce tendency to form soaps, they are opaque and cannot be used in applications where it is necessary or desirable to see the workpiece through the metal treatment fluid. By contrast, U.S. Pat. Nos. 5,707,945 and 5,688,750 disclose the use of water dispersible ETAs, such as water dispersible Priolube 3951, water dispersible Priolube 3952 and water dispersible Priolube 3955 (all TM, ex. Croda Uniqema Inc, Delaware). The descriptions of water dispersible esterified trimer acids found in the '945 and '750 patents are incorporated herein by reference.

The term "trimer acid" used herein carries its customary meaning and includes the polymerised products of unsaturated $C_{16}$ to $C_{20}$ fatty acids. Suitable fatty acids include those derived from soybean oil, tall oil, corn oil, linseed oil, cottonseed oil, castor oil, kapok seed oil, rice bran oil, rapeseed oil, olive oil, sunflower oil, coconut oil, palm kernel oil, beef tallow, tallow and also compounds such as oleic acid, linoleic acid, linolenic acid and tall oil fatty acid.

Mixtures of dimer and trimer acids are typically prepared by condensing these unsaturated carboxylic acids, through their olefinically unsaturated groups, in the presence of catalysts such as acidic clays. The product of the polymerisation is a complex mixture of relatively high weight carboxylic acids, predominately 36-carbon dibasic acids and 54-carbon tribasic acids, with no single structure sufficient to characterise each. Component structures may be acyclic, cyclic (monocyclic or bicyclic) or aromatic. It is impractical to fully fractionate polymerised dimer and trimer acids. Accordingly, commercially available trimer acids contain some dimer acid. Generally, mixtures containing between about 50 to about 90 percent by volume trimers are considered as trimer acids. The relative amounts of trimer and dimer acid present can be determined by gas chromatography, according to methods well known in the art. Dimer and trimer acids are commercially available, for example as, Emprol 1008 (TM ex. Henkel Corporation/Emery Group) and Pripol 1004 (TM ex, Croda Uniqema). In the present invention the ETAs are water dispersible. The ETAs have both ionic and non-ionic surfactant activity.

To provide anionic surfactant activity of the ETA in water, an anionic group (e.g. a carboxylic acid) of the ETA is neutralised with a base. This neutralisation of the ETA leads to the formation of the water dispersible ETA. Any base can be utilised as a neutralisation agent in the production of the water dispersible ETA, e.g. sodium or potassium hydroxide may be suitable. Typically an amine will be used as the base, preferably an organic amine, and it is especially preferred that neutralisation is carried out using triethanolamine (TEA).

Accordingly, the composition of the present invention suitably comprises a water dispersible ETA. The composition may, of course, also comprise the base which is used to neutralise the anionic group.

Preferably, the water dispersible ETA, prior to neutralisation with the base, has a kinematic viscosity from 300 to 2500 $mm^2/s$ at 40° C. It is also preferred that the water dispersible ETA, prior to neutralisation with the base, has a kinematic viscosity from 25 and 150 $mm^2/s$ at 100° C.

Preferably, the water dispersible ETA, prior to neutralisation with the base, has a saponification value of between about 100 and 200 mg KOH/g.

The water dispersible ETA is suitably present in the composition at levels between 10 to 90% w/w, preferably 30 to 60% w/w and especially 40 to 50% w/w where the percentage weight is expressed as a percentage of the combination of water dispersible ETA, block copolymer, polymeric surfactant antifoaming agent (when present) and optional mineral oil or ester oil.

Block copolymers are polymers made up of subunits which are themselves polymers, i.e. they may have the structure AAAA-BBBB-AAAA, wherein A and B are monomers (the number of monomers is, of course, not restricted to 4, and may be any integer within reason). Block copolymers may have more complex structures, such a graft or comb structures, and these may be equally suitable for use in the present invention, as will be apparent to the person skilled in the art.

In a preferred embodiment of the present invention the block copolymer is an amphiphilic block copolymer. A particularly suitable block copolymer comprises polyoxyalkylene blocks, preferably it is comprised substantially entirely from polyoxyalkylene blocks. Particularly suitable polyoxyalkylene blocks include polyoxypropylene (PO) and polyoxyethylene (EO). The polyoxyalkylene blocks may be randomly arranged within the block copolymer or they may be arranged alternatively. Preferably they are arranged alternatively.

Accordingly, a preferred block copolymer of the present invention comprises a structure of (EO) x-(PO) y, where x and y are independently any integer. A further preferred block copolymer of the present invention comprises a structure of (EO)x-(PO)y-(EO)z where x, y and z are independently any integer. x, y and z may be essentially any integer, so long as the block copolymer has the desired properties for use in the composition of the present invention. Typically, x, y and z will be independently any integer from 2 to 100, preferably 4 to 50, more preferably 6 to 40. Particularly preferred block copolymers for use in the present invention are reverse block copolymers comprising a structure of (PO) x-(EO) y-(PO) z, where x, y and z are independently any integer. The ends of the structures set out above may be unmodified, or may comprise a chain terminating agent.

Suitably, the block copolymer of the present invention has a relatively high molecular weight, e.g. from about 1000 to 10,000 Daltons (Da), more preferably from 2000 Da to 7000 Da, and more preferably from 2000 Da to 4000 Da.

Suitably, the block copolymer of the present invention comprises from 10 to 70% w/w EO, more preferably from 15% to 50% w/w EO, especially from 20% to 40% w/w EO, where the percentage weight is expressed as a percentage of the combination of water dispersible ETA, block copolymer, polymeric surfactant antifoaming agent (when present) and optional mineral oil or ester oil. In particular, the block copolymer comprises at least 10% w/w EO, more preferably at least 15% w/w EO, especially at least 20% w/w EO. The block copolymer comprises not more than 70% w/w EO, more preferably not more than 50% w/w EO, especially not more than 40% w/w EO. In one embodiment of the present invention, the block copolymer is a di-functional block copolymer with terminal hydroxyl groups.

Particularly suitable reverse block copolymers based on EO and PO for use in the present invention are available commercially under the trade mark Pluronic (ex. BASF Corp., N.J.). Such copolymers have high average molecular weights, typically ranging between from 2000 to 4000 Da.

The composition of the present invention may suitably comprise water dispersible ETA and block copolymer at a ratio of from 1:10 to 10:1 w/w water dispersible ETA to block co-polymer. Preferably the ratio of water dispersible ETA to block copolymer is from 5:1 to 1:5 w/w, more preferably from 3:1 to 1:3 w/w, and particularly from 2:1 to 1:2 w/w. In some embodiments, the ratio of water dispersible ETA to block copolymer may be especially from 1.5:1 to 1:1.5 w/w.

In accordance with the second aspect of the invention, as previously mentioned, the composition comprises a polymeric surfactant anti-foaming agent. The polymeric surfactant anti foaming agent comprises a polar tail group which itself comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties.

Each monomeric repeat unit of the polymeric backbone comprises a hydrocarbon chain functionalised by the presence of at least one electronegative element or moiety. The hydrocarbon chain may be a saturated or unsaturated, preferably saturated aliphatic chain. The hydrocarbon chain may be straight chained or branched. It is preferably branched. It is preferably a divalent radical. It preferably contains from 8 to 35, more preferably 10 to 25 and especially 12 to 20 carbon atoms. Preferably the electronegative element or moiety is chosen from oxygen, ester (defined as —COO—), and amide (defined as —CONH—). More preferably the electronegative element or moiety is chosen from oxygen or ester and especially ester. Preferably, the electronegative element or moiety is in the backbone of the monomeric repeat unit rather than being a pendant group. An especially preferred monomeric repeat unit is where the hydrocarbon chain is CH3—(CH2)5—CH—(CH2)10-and the electronegative element or moiety is ester.

The number of monomeric repeat units ranges from 2 to 30, preferably 2 to 20 and more preferably 3 to 15.

The tail group is linked at one end, directly or indirectly, preferably directly to a polar head group which comprises a polar moiety selected from at least one of acid, ester, amide or alcohol moieties. Preferably the polar moiety is an acid or amide moiety. The other end of the tail group is terminated with a chain terminating group. The precise structure of the chain terminating group is not critical provided it is inert to other components of the composition under the normal processing conditions to which it is subjected. Preferably it has a molecular weight of less than 800, more preferably less than 500 and especially less than 300. Preferably it contains only carbon, hydrogen and oxygen atoms.

A preferred polymeric surfactant antifoaming agent is derived from the polyesterification of a hydroxyalkyl acid, where the alkyl group has from 8 to 35 carbon atoms, preferably 10 to 25 and especially 12 to 20 carbon atoms. An especially preferred hydroxyalkyl acid is 12-hydroxystearic acid. In this case the chain terminating group of the tail group is derivable from the hydroxyalkyl acid itself or from the non-hydroxyl analogue of the hydroxy acid which is generally present in the commercial grades of the hydroxy acids available. The chain terminating group can also be derived from any convenient acid that may be added to the polyesterification reaction mixture. Such convenient acids include saturated or unsaturated, preferably saturated monocarboxylic acids having 12 to 22 carbon atoms. A specific example is isostearic acid. The polar head group of this preferred polymeric surfactant antifoaming agent comprises an acid grouping.

The polyesterification may be performed by heating the hydroxyalkyl acid, optionally in the presence of the chain terminating group, preferably in the presence of an esterification catalyst, such as tetrabutyl titanate, zirconium naphthenate, zinc acetate or toluene sulphonic acid, at a temperature between 100 and 3000° C. The water formed in the esterification reaction is preferably removed from the reaction medium, and this can be done by passing a stream of nitrogen through the reaction mixture or carrying out the reaction in the presence of a solvent, for example xylene or toluene, and distilling off the water as it is formed.

The polymeric surfactant anti foaming agent has a number average molecular weight of between 500 and 10,000, preferably 500 to 7,000, more preferably 500 to 5,000 and especially 700 to 3,000. The number average molecular weight of the polymer can be determined by many techniques. Gel permeation chromatography (GPC) is a well known technique that has been employed to determine the number average molecular weight for the dispersant of the invention.

The polymeric surfactant antifoaming agent is suitably present in the composition at levels between 3 to 50% w/w, preferably 5 to 20% w/w and especially 10 to 15% w/w, where the percentage weight is expressed as a percentage of the combination of water dispersible ETA, block copolymer, polymeric surfactant antifoaming agent and optional mineral oil or ester oil.

The composition of the present invention may suitably comprise a polar solvent. In one embodiment the polar solvent may comprise up to 99.9% w/w of the composition. Preferably the polar solvent comprises from 40 to 99.5% w/w of the composition, more preferably from 60 to 99% w/w of the composition, especially 60 to 90% w/w of the composition. It is highly preferred that the polar solvent is water, though other polar solvents (e.g. alcohols) may be useful in certain circumstances.

Compositions comprising a water dispersible ETA and a block copolymer mixture exhibit desirable characteristics, e.g. in relation to one or more of stability, lubricity or clarity, when used in a metal working fluid. The combination of water dispersible ETA and block copolymer appears to result in synergistic effects, i.e. benefits are shown by the combination which are greater than would be expected from a simple combination.

In particular, compositions according to embodiments of the present invention demonstrate a marked decrease in work energy compared with know RBCP containing metal working fluids, or with comparable concentrations of water dispersible ETA or block copolymer alone. This increase in lubricity, and consequent reduction in, e.g. drilling torque, is particularly evident in respect of aluminium.

The synergies between water dispersible ETA and block copolymer in metal working fluids also produce improved visual properties. The inadequacies associated with conventional metal working fluids, particularly those using RBCPs, are mentioned above. It appears the combination of water dispersible ETA and block copolymer reduces, or in some case eliminates, problems with opacity in metal working compositions. Where a water dispersible ETA base fluid is opaque, and a copolymer base fluid is hazy and opaque, unexpectedly when these base fluids are combined and stirred, clear solutions are produced.

A related feature demonstrated by the compositions of the present invention is the apparent ability of the water dispersible ETA to stabilise the block copolymer at typical elevated temperatures used for storage. This is, for example, seen when water dispersible Priolube 3955 (ie 3955 reacted with triethanolamine (TEA)) is added to a fully formulated synthetic package containing RBCP's. Clarity, is maintained at 50° C., which is well above the cloud point of the RBCP alone. In the absence of the water dispersible ETA the solution would separate and become opaque.

It should be noted that the composition may comprise more than one type or species of block copolymer or water dispersible ETA, or indeed any other constituent compound.

The composition of the present invention may suitably comprise one or more of an oil (especially a mineral oil or ester oil), a corrosion inhibitor, a stabilizer, an antioxidant, a viscosity modifier, a biocide or a foam suppressant or any other metal working additive known to those skilled in the art. Other such compositions, e.g. those known in the art of metal working fluids, may be included as deemed suitable. The addition of an oil component, particularly a mineral oil, to the composition can demonstrate significant advantages in terms of increased lubricity. This lubricity is particularly evident in aluminium working applications, which is particularly significant given the long felt need in the industry for improved metal working fluids for aluminium. When present, the mineral oil or ester oil is preferably selected from a Group I mineral oil or an aromatic ester having the formula R1—(AO)n OOC-Ph-(R2)p where R1 is a C1 to C15 alkyl group, AO is an alkyleneoxy group which may vary along the (poly)alkyleneoxy chain and Ph is a phenylene group, which may be substituted with groups (R2)p, where each R2 is independently an alkyl, halogen, haloalky or alkoxy group; n is 0 or at least 1; and p is 0 or from 1 to 3.

R1 may be a branched or straight chained alkyl group, preferably a branched alkyl group and it may be saturated or unsaturated. R1 preferably ranges from a C1 to C10 alkyl group, more preferably from a C2 to C8 alkyl group. Examples of R1 include straight-chained alkyls and iso butyl and tertiary alkyls. R1 is preferably nonyl, 2-ethyl hexyl, hexyl, tert-butyl, iso-butyl, sec-butyl, iso-propyl, propyl ethyl or methyl and more preferably 2-ethylhexyl, isobutyl or iso-propyl.

Preferably p is 0, i.e. the Ph is unsubstituted.

AO is particularly an ethyleneoxy or a propyleneoxy group, and may vary along the (poly)alkyleneoxy chain. When present, the (poly)alkyleneoxy chain is desirably a (poly)ethyleneoxy, a (poly)propyleneoxy chain or a chain including both ethyleneoxy and propyleneoxy residues. When present, n is preferably from 1 to 20. Preferable alkoxylate esters are benzoate esters of diethyleneglycol monomethylether, decaethyleneglycol monomethylether (i.e. 10 ethylene oxide units) and C9/C11 monohydric alcohol ethoxylated with 2.5 ethylene oxide units.

Generally, in preferred aromatic esters n is 0. When n is 0, the aromatic ester is most preferably iso-propyl benzoate, isobutyl benzoate or 2-ethyl hexyl benzoate, and especially 2-ethylhexyl benzoate.

The mineral oil or ester oil is suitably present in the composition at levels between 0 to 25% w/w, preferably 2 to 15% w/w and especially 5 to 9% w/w, where the percentage weight is expressed as a percentage of the combination of water dispersible ETA, block copolymer, polymeric surfactant antifoaming agent and optional mineral oil or ester oil.

An especially preferred composition contains, by weight:
45% water dispersible ETA
35% block copolymer
13% polymeric surfactant antifoaming agent
7% mineral oil or ester oil
where percentage weight is expressed as a percentage of the combination of water dispersible ETA, block copolymer, polymeric surfactant antifoaming agent and mineral oil or ester oil.

A particular problem associated with working aluminium workpieces is that newly exposed surfaces on the aluminium workpieces tend to discolour, often significantly. Although metal working fluids made in accordance with the invention appeared to offer improvements in this area, this may be at the expense of the stability of the fluids.

In accordance with another embodiment of the present invention, the composition further comprises a phosphate ester. The presence of phosphate esters in the composition ensures the aluminium workpieces remain stain free as well as improving the stability of metal working fluids according to the invention in the presence of such workpieces.

The phosphate ester is preferably present in the composition at not more than 5% w/w, more preferably not more than 2% w/w and especially not more than 1% w/w, where the percentage weight is expressed as a percentage of the combination of water dispersible ETA, block copolymer, optional polymeric surfactant antifoaming agent and optional mineral oil or ester oil. Preferably, the phosphate ester is present in the composition at least at 0.1% w/w, more preferably, at least at 0.3% w/w and especially at least at 0.5% w/w.

Typical examples of phosphate esters that are useful in the present invention include oleth-6 phosphate ester (available as Monalube 215™ from Uniqema), oleth-3 phosphate ester (available as Crodafos N3™ from Croda) and oleth-4 phosphate ester (available as Ethfac 140™ from Ethox Chemicals).

In contrast, although stability improvements of compositions in accordance with the invention in the presence of aluminium workpieces could be achieved using for example additives such as alkyl ether carboxylic acids, examples of which are available as Emulsogen COL 050™ and Emulsogen COL 100™ from Clariant, and alkyl ether phosphate esters, an equivalent improvement in the reduction of staining of aluminium workpieces was not achieved.

According to a further aspect of the present invention there is provided a metal working fluid comprising a composition as set out above. The metal working fluid may suitably be a synthetic or semi-synthetic fluid.

Suitably the metal working fluid comprises a block copolymer, a water dispersible ETA, a corrosion inhibition component, an organic acid, an alcohol and water. A preferred corrosion inhibitor comprises a plurality of constituents, e.g. monoisopropanolamine, diisopropanolamine, Monacor 4000 (TM, ex. Croda Uniqema Inc., Delaware), Monacor BE (TM, ex. Croda Uniqema Inc., Delaware).

A preferred organic acid is neodecanoic acid.

A preferred alcohol is a C10 to C20 alcohol, more preferably a C14 to C18 alcohol, especially a branched alcohol.

According to a further aspect the present invention provides a method of manufacturing a composition comprising the steps of:
  providing a block copolymer;
  providing a water dispersible esterified trimer acid (ETA);
  optionally providing a polymeric surfactant antifoaming agent;
  optionally providing an oil selected from the group consisting of a mineral oil, an ester oil and mixtures thereof;
  mixing the block copolymer and the water dispersible ETA and, if present, the polymeric surfactant antifoaming agent and, if present the oil together to form a concentrate; and
  adding water to the concentrate to form the composition.

Preferred details of the block copolymer, the water dispersible ETA, the polymeric surfactant antifoaming agent and the oil are set out above.

The method may comprise the step of neutralising the ETA with a base, especially an amine. Preferably the neutralisation step is performed in situ during formation of the ETA to form the water dispersible ETA.

The water dispersible ETA and block copolymer may be provided at a ratio of from 1:10 to 10:1 w/w, preferably from 1:5 to 5:1 w/w. Preferred ratios are set out above.

In a further aspect, the present invention provides a method of working metal comprising;
  applying a composition comprising a block copolymer and a water dispersible esterified trimer acid (ETA) and optionally a polymeric surfactant antifoaming agent to at least a portion of the surface of a metal workpiece to be worked; and
  working the workpiece.

In one embodiment the workpiece is a ferrous, steel or ferrous alloy workpiece, preferably a steel workpiece. In this embodiment a particularly preferred composition has an approximate 1:1 w/w ratio of water dispersible ETA to block copolymer.

In an alternative the workpiece is an aluminium or aluminium alloy workpiece. In this embodiment a particularly preferred composition has an approximate 1:2 ratio w/w of water dispersible ETA to block copolymer.

However, it should be understood that the workpiece may be of essentially any other metal or alloy, for example titanium, zinc, magnesium, brass, bronze, copper or tin, as it would be expected that the benefits of the compositions of the present invention would occur in any metal. However, it might be expected that the benefits would be greatest in relatively rapidly oxidising metals and accordingly methods in which such materials are worked are referred. By "relatively rapidly oxidising" it should be understood metals in which a newly cut metal surfaces oxidise as quickly as, or quicker than, aluminium.

Suitably the working comprises drilling, tapping, turning, milling, grinding, punching, deep drawing, stamping, cutting, rolling and like operations. The compositions of the present invention have shown particular utility in processes which involve cutting or abrasion of the surface of the metal. As such drilling, tapping, milling, turning and grinding are preferred methods of working, in particular drilling and tapping. In a further aspect the present invention provides use of a composition comprising a block copolymer and a water dispersible esterified trimer acid in the production of a metal working fluid.

In a further aspect the present invention provides use of a composition comprising a block copolymer, a water dispersible esterified trimer acid and a polymeric surfactant antifoaming agent in the production of a metal working fluid.

Production of a metal working fluid may comprise the steps of:
  providing a composition comprising a block copolymer and a water dispersible esterified trimer acid optionally including a polymeric surfactant antifoaming agent and optionally including a mineral oil or an ester oil; and
  mixing said composition with water.

Specific embodiments of the present invention will now be described, by way of example only.

EXAMPLE 1

Block Copolymers

Table 1 shows some examples of suitable block copolymers for use in the present invention, along with some physical properties of the copolymers. All the copolymers are PO-EO-PO reverse block copolymers (RBCP) and available from the BASF under the trade mark Pluronic.

TABLE 1

| Pluronic | 17R2 | 17R4 | 25R2 | 25R4 |
| --- | --- | --- | --- | --- |
| Ave MW | 2150 | 2650 | 3100 | 3600 |
| % EO (Y) | 20 | 40 | 20 | 40 |

An example of a suitable random EO-PO block copolymer (BCP) is Emkarox™ VG 681W available ex Croda Uniqema Inc. which has an average molecular weight of 3870 and has 50% EO.

EXAMPLE 2

Esterified Trimer Acids

Table 2 shows examples of suitable ETAs for use in the present invention, along with some physical properties of the ETAs. All examples are available from the Croda Uniqema Inc. Priolube™ range.

TABLE 2

| Property | Priolube 3952 | Priolube 3951 | Priolube 3955 |
| --- | --- | --- | --- |
| Saponification Value | 134 | 165 | 142 |
| Kinetic Viscosity at 40° C. (mm²/s) | 410 | 2315 | 420 |
| Kinetic Viscosity at 100° C. | 39 | 119 | 40 |

EXAMPLE 3

Polymeric Surfactant Antifoaming Agents

An example of a suitable polymeric surfactant antifoaming agent for use in the invention is Hypermer™ LP1—a polyester based surfactant available ex Croda Uniqema Inc.

EXAMPLE 4

Mineral Oils and Ester Oils

Examples of ester oils suitable for use in the invention are iso-propyl benzoate, isobutyl benzoate or 2-ethyl hexyl benzoate. Examples of suitable mineral oils are Group I mineral oils (according to API classification).

EXAMPLE 5

Method of Production of a Composition According to the Present Invention

Water dispersible ETAs (ie the ETAs of Example 2 which have been neutralised with triethanolamine (TEA)) and block copolymers (as set out in Example 1) are mixed together in water. The mixing can be achieved by any conventional mixing apparatus.

The water dispersible ETA and block copolymer can be mixed in ratios of for example from 10:1 to 1:10 (water dispersible ETA: block copolymer).

The amount of water in the composition can be varied as required, but is often from 40 to 90% w/w and more particularly around 70 to 80% w/w.

EXAMPLE 6

Microtap Experiments for Synthetic Systems.

This experiment was conducted to assess the efficacy of compositions in reducing friction in tapping operations.

Test base fluid concentrates were produced according to Table 3 below. Each of the block copolymers mentioned in Example 1 were assessed. The ETA used was Priolube 3955 in each case, which was neutralised with TEA.

These base fluid concentrates were then diluted to 10% base fluid systems in water to from metal working fluids.

TABLE 3

| MWF (A) | MWF (B) | MWF (C) (blend of MWF (A) + MWF (B)) |
| --- | --- | --- |
| Priolube 3955 20% | Block copolymer 20% | Priolube 3955/Block copolymer 20% |
| TEA 4% | TEA 4% | TEA 4% |
| Water 76% | Water 76% | Water 76% |

(MWF = metal working fluid)

The MWF systems (A), (B) and (C) were tested by the tapping torque test using a Microtap instrument, model Megatap II, to produce an evaluation of performance of the systems. Uncoated steel form caps on predrilled aluminium (6061 grade) or steel (1018 or 4140 grade) were used to generate the data shown in Table 4.

The ETA MWF system (A) is used in the experiment as a standard fluid. This represents a water dispersible ETA in an aqueous solvent. The torque associated with the standard fluid is assigned a rating of 100% and the experimental values are defined relative to this standard. Higher percentage values indicate that more torque was required relative to the standard (i.e. a poorer performance) and lower percentage values indicate less torque required (i.e. improved performance). Differences of 5% are deemed to be significant both in terms of experimental variations and in terms of industry acceptance.

TABLE 4

| Material | 6061 Aluminium | 1018 Steel | 4140 Steel |
| --- | --- | --- | --- |
| ETA MWF (A) | 100% | 100% | 100% |
| 25R2 RBCP MWF (B) | 141% | 115% | 119% |
| ETA + 25R2 RBCP (1:1) MWF (C) | 75% | 80% | 82% |
| 17R2 RBCP MWF (B) | 148% | 140% | 127% |
| ETA + 17R2 RBCP (1:1) MWF (C) | 75% | 78% | 79% |
| 17R4 RBCP MWF (B) | Not tested | 134% | Not tested |
| ETA + 17R4 RBCP (1:1) MWF (C) | Not tested | 78% | Not tested |
| 25R4 RBCP MWF (B) | 163% | 126% | Not tested |
| ETA + 25R4 RBCP (1:1) MWF (C) | 90% | 79% | Not tested |
| VG681 W BCP MWF (B) | 156% | Not tested | Not tested |
| ETA + VG681W BCP (1:1) MWF (C) | 85% | Not tested | Not tested |

These Microtap experiments clearly demonstrate a highly significant synergistic effect when used in the aluminium test system. An improvement is seen in the steel test systems is also demonstrated. All the MWF systems (C) based on water dispersible ETA/RBCP and water dispersible ETA/BCP blends show improved results relative to the water dispersible ETA, RBCP and BCP based MWF systems (A) and (B). It would be expected that MWF systems based on a blend of water dispersible ETA and RBCP and on a blend of water dispersible ETA and BCP would give results more akin to that of the average of the two base MWF systems (A) and (B), but this is clearly shown not to be the case and the MWF systems based on these blends significantly outperform the expected result.

EXAMPLE 7

Effective Concentration of ETA to RBCP Blends in Synthetic Systems.

Additional Microtap tests were carried out along side those illustrated in Table 4 above. These experiments were designed to look at the range of effective concentrations of ETA to RBCP blends investigated using the concentrates based on the water dispersible ETA PRIOLUBE™ 3955 and RBCP PLURONIC™ 25R2 blends in various dilutions using water. Again the standard MWF used here was the metal working fluid containing only the water dispersible ETA (MWF (A) in Example 6), and this is assigned a nominal value of 100%. The concentrate based on ETA/RBCP blend was diluted to give a series of concentration reducing from 10% w/w to 5% w/w.

TABLE 5

| Material | 6061 Aluminium | 1018 Steel | 4140 Steel |
| --- | --- | --- | --- |
| ETA base | 100% | 100% | 100% |
| 10% ETA/RBCP (1:1) | 75% | 80% | 82% |
| 7.5% ETA/RBCP (1:1) | 72% | 84% | 85% |
| 5% ETA/RBCP (1:1) | 74% | Not tested | Not tested |

It can be seen from Table 5 that all the ETA/RBCP blend concentrations tested were more effective than the ETA base fluid on its own, and that the ETA/RBCP did not lose efficacy down to the minimum 5% w/w concentration tested. This is particularly significant when used in the aluminium test system.

EXAMPLE 8

Effectiveness of Various ETA:RBCP Ratios for Synthetic Systems.

Various ETA to RBCP ratios were tested alongside the Microtap experiments carried out in Examples 4 and 5 above. The water dispersible ETA used was again PRIOLUBE™ 3955 (10% dilution) neutralised with TEA and the RBCPs used were Pluronic™ 25R2 (1) and 17R2 (2). Again the standard MWF used here was the metal working fluid containing only the water dispersible ETA (MWF (A) in Example 6), and this is assigned a nominal value of 100%.

All of the ratios tested show significant improvements in performance above the standard fluid. A ratio of 1:2 shows the greatest improvement in the aluminium testing system. In the steel testing system the most effective ratio appears to be 1:1. The experiment demonstrates that the composition of the present invention is effective over a broad range of ratios, and even broader ranges might reasonably be expected to be effective. For the compositions tested, ratios up to 1:5/5:1 are shown to be highly effective, but it appears the efficacy may well taper off at ratios above this.

TABLE 6

| Material | 6061 Aluminium | 1018 Steel | 4140 Steel |
| --- | --- | --- | --- |
| ETA MWF | 100% | 100% | 100% |
| 10% Dilution (ETA:25R2, 1:5) | 105% | 95% | 102% |
| 10% Dilution (ETA:25R2, 1:3) | 77% | Not tested | Not tested |
| 10% Dilution (ETA:25R2, 1:2) | 69% | 82% | 80% |
| 10% Dilution (ETA:25R2, 1:1) | 75% | 80% | 82% |
| 10% Dilution (ETA:25R2, 2:1) | 78% | 92% | 88% |
| 10% Dilution (ETA:25R2, 3:1) | 91% | Not tested | Not tested |
| 10% Dilution (ETA:25R2, 5:1) | 107% | 105% | 117% |
| 10% Dilution (ETA:17R2, 1:1) | 75% | 78% | 79% |
| 10% Dilution (ETA:17R2, 2:1) | 78% | 99% | 87% |

EXAMPLE 9

A Typical Metal Working Fluid for a Synthetic System.

RBCP-containing compositions are generally unstable at typical elevated storage temperatures of 50° C. due to typical RBCP cloud points of 25 to 35° C. The combination of water dispersible ETA and RBCP allows one to formulate metal working fluid concentrates having stability at 50° C. or more (i.e. 21° C. above the 25R2 cloud point). This is a significant advantage in terms of being able to produce a concentrate that does not separate or stratify in heated storage conditions.

Table 7 below shows an example of a metal working fluid composition including water dispersible ETA and RBCP for use in a conventional metal working method. The composition of Table 7 has stability at 50° C. Without the water dispersible ETA, but with identical concentrations of other constituents, the cloud point of the composition is 39° C.

The other constituents reflect typical additional constituents in a metal working fluid. Further details of the corrosion inhibition package are provided for in Table 8.

TABLE 7

| Metal working fluid formulation | |
| --- | --- |
| Corrosion inhibition package | 22% |
| RCBP 25R2 | 10% |
| RCBP 17R2 | 4% |
| Water dispersible 3955 | 8% |
| Neodecanoic acid | 4% |
| C16 branched alcohol | 2% |
| water | 50% |

TABLE 8

| Corrosion inhibition package | |
| --- | --- |
| Monoisopropanolamine | 8% |
| 85% Diisopropanolamine | 60% |
| Monacor 4000 | 16% |
| Monacor BE | 16% |

EXAMPLE 10

Examples of Semi-synthetic Formulations and Further Test Data

Examples 1, 2 and 5 to 9 relate to compositions for use in "synthetic" systems. The present example is directed to semi-synthetic systems. The experiment was performed, in particular to determine the effect of adding mineral oil to the composition. Inclusion of approximately 4% to 40% mineral oil is typical of the family of MWFs known as "semi-synthetics". Product concentrates containing more than approximately 40% mineral oil are generally known as soluble oils.

Various mineral oil based water dispersible ETA/RBCP blends were produced to measure the effectiveness of semi-synthetic metal working systems.

Microtap testing was carried out as described previously. Additionally, visual properties of the test fluids were assessed.

The formulations are shown in Table 9a and the results are shown in Table 9b, again relative to ETA MWF (A) above in Example 6 (100%).

TABLE 9a (PIBSA = Poly isobutenyl succinic anhydride)

| Formulation | A | B | C | D | E | F |
|---|---|---|---|---|---|---|
| Mineral Oil | 8 part | 5 parts | 5 parts | 5 parts | 5 parts | 7.5 parts |
| PIBSA | 0 | 3 | 3 | 3 | 3 | 3 |
| ETA 3955/TEA | 4 | 7.2 | 6 | 0 | 4 | 4 |
| ETA 3952/TEA | 4 | 2.4 | 0 | 6 | 4 | 4 |
| RBCP 25R2 | 4 | 2.4 | 6 | 6 | 4 | 4 |
| Water | 25 | 25 | 25 | 25 | 25 | 25 |

TABLE 9b

| Formulation | A | B | C | D | E | F |
|---|---|---|---|---|---|---|
| Microtap 6061 Aluminium | 42% | 45% | 43% | 43% | 43% | 41% |
| Microtap 4140 Steel | Not tested | Not tested | 97% | 109% | 102% | 100% |
| Appearance of 10% Dilution | Opaque | Translucent | Translucent | Opaque | Translucent | Opaque |

Improvements in Microtap results are seen for aluminium testing systems in all of the tests carried out. The visual properties of formulations varied at 10% dilutions, with translucent properties being preferable.

EXAMPLE 11

Usage of High Molecular Weight RBCP in Semi-synthetic Systems.

Use of high weight RBCP PLURONIC™ 90R4, which has a molecular weight of 7000, in combination with water dispersible PRIOLUBE™ 3955 was assessed in a semi-synthetic system. The Microtap test was used as described above, and the standard fluid was again the ETA MWF(A) of Example 6. The results are shown in Table 10. The conditions used were similar to those of Example 10.

TABLE 10

| Material | 6061 Aluminium | 1018 Steel | 4140 Steel |
|---|---|---|---|
| ETA MWF | 100% | 100% | 100% |
| RBCP | 151% | 135% | 154% |
| ETA + RBCP base (1:1) in water | 84% | 77% | 78% |
| ETA + RBCP base (1:1) with mineral oil | 50% | 82% | 80% |

It can be seen from Table 10 that use of water dispersible ETA to RCBP at a ratio of 1:1 in a semi-synthetic has improved Microtap performance over the same water based system, when used to machine an aluminium test system. This demonstrates that the compositions of the present invention are suitable for both synthetic and semi-synthetic systems, and indeed their use in a semi-synthetic system may confer additional advantages.

EXAMPLE 12

Example of a Formulation Containing Stability Surfactants.

Table 11 shows an example of a metal working fluid composition including water dispersible ETA and RBCP for use in metal working fluid which additionally uses a polymeric surfactant as a stabiliser.

TABLE 11

| Metal working fluid formulation | |
|---|---|
| Synperonic 25R2 | 55% |
| Water dispersible Priolube 3952 | 30% |

TABLE 11-continued

| Metal working fluid formulation | |
|---|---|
| Hypermer 2234 | 10% |
| Mineral oil | 5% |

EXAMPLE 13

Method of Production of a Composition According to the Present Invention

Water dispersible ETAs, 10-90% w/w (i.e. the ETAs of Example 2 which have been neutralised with triethanolamine (TEA)), block copolymers, 10-90% w/w (as set out in Example 1), polymeric surfactant antifoaming agents, 3-50% w/w (Example 3) and optionally mineral oil or ester oil, 0-25% w/w (Example 4) are mixed together to form a concentrate.

The concentrate is then diluted by mixing with water. The amount of water in the composition can be varied as required, but is often from 40 to 90% w/w and more particularly around 70 to 80% w/w, where 100% represents the combination of the concentrate and the water.

The mixing can be achieved by any conventional mixing apparatus.

EXAMPLE 14

Exemplification of Low Foaming Properties of a Composition According to the Present Invention 45% w/w of Priolube™ 3952 (which has been neutralised with triethanolamine (TEA)), 35% w/w of PLURONIC™ 25R2, 13% w/w HYPERMER™ LP1 and 7% w/w 2-ethyl hexylbenzoate were mixed together to form a concentrate according to the present invention.

15% w/w of the concentrate was mixed with 15% w/w of corrosion inhibition package (as defined below in Table 12) in water.

TABLE 12

| Corrosion inhibition package | |
|---|---|
| Monoisopropanolamine | 8% |
| 85% Diisopropanolamine | 60% |
| Monacor 4000 | 16% |
| Monacor BE | 16% |

This concentrate/corrosion inhibition package (C/CIP) mixture was then further diluted with water (having 100 ppm hardness) to form a metal working fluid (MWF) having 5% w/w of the mixture in it.

300 ml of this MWF was mixed in a high speed Waring Blender for 30 secs. Foam height was then measured over a 4 minute period. Table 13 illustrates the results as compared to metal working fluids similarly containing 5% w/w of three commercial cutting fluids made using water having 100 ppm hardness.

Similar metal working fluids were made using the 5% w/w C/CIP mixture according to the invention and 5% w/w of the three commercial cutting fluids but using water having 25 ppm hardness. Table 14 illustrates the results achieved using these MWF.

TABLE 13

| | Foam Height in mm | | | |
|---|---|---|---|---|
| Time (Seconds) | 5% w/w C/CIP according to invention | 5% w/w of Blaser 4000 - ex Blaser Swisslube Inc | 5% w/w of Hocut 795B - ex Houghton | 5% w/w of Hangsterfer S1001 - ex Hangsterfer |
| 0 | 180 | 600 | 240 | 400 |
| 30 | 0 | 560 | 160 | 340 |
| 60 | 0 | 520 | 100 | 300 |
| 120 | 0 | 500 | 40 | 280 |
| 180 | 0 | 470 | 0 | 260 |
| 240 | 0 | 440 | 0 | 240 |

TABLE 14

| | Foam Height in mm | | | |
|---|---|---|---|---|
| Time (Seconds) | 5% active composition according to invention | 5% active Blaser 4000 - ex Blaser Swisslube Inc | 5% active Hocut 795B - ex Houghton | 5% active Hangsterfer S1001 - ex Hangsterfer |
| 0 | 260 | 600 | 350 | 500 |
| 30 | 100 | 600 | 300 | 440 |
| 60 | 60 | 600 | 250 | 440 |
| 120 | 40 | 580 | 150 | 380 |
| 180 | 20 | 560 | 120 | 340 |
| 240 | 0 | 560 | 120 | 300 |

Tables 13 and 14 clearly illustrate that the composition according to the invention is effective at reducing or eliminating foam in a metal working composition.

EXAMPLE 15

Microtap Experiments for Synthetic Systems

This experiment was conducted to assess the efficacy of compositions in reducing friction in tapping operations.

45% w/w of PRIOLUBE™ 3952 (which has been neutralised with triethanolamine (TEA)), 35% w/w of PLURONIC™ 25R2, 13% w/w HYPERMER™ LP1 and 7% w/w 2-ethyl hexylbenzoate were mixed together to form a concentrate according to the present invention. This concentrate was then diluted using water with 300 ppm hardness content to form a metal working solution according to the invention having 8% active ingredients, Solution A.

A second metal working solution according to the invention, Solution B, similarly to Solution A but with 7% w/w of water being replaced by 7% w/w of a Group 1 mineral oil.

The metal working solutions A and B and comparative commercially available cutting fluids, which were made into solutions similarly to Solution A, were tested by the tapping torque test using a Microtap instrument, model Megatap II to produce an evaluation of cutting efficiency.

Uncoated steel form taps on predrilled aluminium (6061 grade) or steel (1018) workpieces were run at 700 rpm and 500 rpm respectively to generate average torque values which were normalised relative to a chosen reference oil. Percentage cutting efficiencies were calculated from the average torque values using the following calculation:

$$\% \text{ cutting efficiency} = \frac{100 * \text{reference oil torque}}{\text{torque using metal working solution}}$$

The results are shown in Table 15.

TABLE 15

| | % Cutting Efficiency | |
|---|---|---|
| Metal working solution | 6061 Aluminium | 1018 Steel |
| Solution A | 141 | 130 |
| Solution B | 170 | 150 |
| Blaser 4000 | 115 | 110 |
| Hocut 795B | 128 | 83 |
| Hangsterfer S 1001 | 100 | 100 |

Table 15 clearly illustrates that metal working Solutions A and B according to the invention have enhanced cutting efficiencies with both ferrous and non-ferrous metallurgies as compared to comparative commercial metal working solutions.

What is claimed is:

1. A composition comprising a water dispersible esterified trimer acid and a block co-polymer.

2. A composition comprising a water dispersible esterified trimer acid, a block co-polymer and a polymeric surfactant antifoaming agent.

3. The composition of claim 1 wherein said esterified trimer acid is esterified with a component selected from the group consisting of an alkylalkoxy alcohol and an alkylalkoxy alcohol in combination with an alkyl alcohol.

4. The composition of claim 1 wherein the esterified trimer acid, prior to neutralisation with a base, has a kinematic viscosity from 300 to 2500 mm$^2$/s at 40° C.

5. The composition of claim 1 wherein the esterified trimer acid, prior to neutralisation with a base, has a kinematic viscosity from 25 and 150 mm$^2$/s at 100° C.

6. The composition of claim 1 wherein the esterified trimer acid, prior to neutralisation with a base, has a saponification value of between about 100 and 200 mg KOH/g.

7. The composition of claim 1 wherein the block copolymer is comprised substantially entirely of polyoxypropylene (PO) and polyoxyethylene (EO) blocks.

8. The composition of claim 1 wherein the block copolymer has a structure selected from the group consisting of:

$(EO)_x$-$(PO)_y$ $(EO)_x$-$(PO)_y$-$(EO)_z$ $(PO)_x$-$(EO)_y$-$(PO)_z$ where x, y and z are independently any integer.

9. The composition of claim 1 wherein the block copolymer has a molecular weight of from about 1000 to 10,000 Daltons.

10. The composition of claim 1 wherein the block copolymer comprises from 10 to 50% w/w EQ.

11. The composition of claim 1 comprising the water dispersible esterified trimer acid and block copolymer at a ratio of from 5:1 to 1:5 w/w.

12. The composition of claim 2 wherein the polymeric surfactant antifoaming agent comprises a polar tail group which itself comprises a polymeric backbone of 2 to 30 monomeric repeat units, each repeat unit comprising a hydrocarbon chain functionalised by the presence of at least one electronegative element or moiety, the tail group being linked to a polar head group which comprises a polar moiety selected from at least one of acid, ester, amide or alcohol moieties.

13. The composition of claim 12 wherein the hydrocarbon chain of the polar tail group of the polymeric surfactant antifoaming agent is a divalent radical which may be straight chained or branched and contains from 8 to 35 carbon atoms.

14. The composition of claim 12 wherein the hydrocarbon chain of the polar tail group of the polymeric surfactant antifoaming agent is $CH_3$—$(CH_2)_5$—CH—$(CH_2)_{10}$—.

15. The composition of claim 12 wherein the electronegative element or moiety of the hydrocarbon chain of the polar tail group of the polymeric surfactant antifoaming agent is selected from the group consisting of oxygen, ester (defined as —COO—) and amide (defined as —CONH—) or mixtures thereof and is positioned either in the backbone or is a pendant group to the monomeric repeat unit.

16. The composition of claim 15 wherein the electronegative element or moiety of the hydrocarbon chain of the polar tail group of the polymeric surfactant antifoaming agent is ester (defined as —COO—) which is positioned in the backbone of the monomeric unit repeat unit.

17. The composition of claim 12 wherein the number of monomeric repeat units in the polymeric backbone of the polymeric surfactant antifoaming agent ranges from 3 to 13.

18. The composition of claim 2 wherein the polymeric surfactant antifoaming agent is derived from the polyesterification of a hydroxyalkyl acid where the alkyl group has 8 to 35 carbon atoms.

19. The composition of claim 2 wherein the polymeric surfactant antifoaming agent is derived from the polyesterification of 12-hydroxystearic acid.

20. The composition of claim 1 comprising up to 99% water.

21. The composition of claim 1 comprising more than one type of species of block copolymer and/or water dispersible esterified trimer acid and/or polymeric surfactant antifoaming agent.

22. The composition of claim 1 further comprising an oil selected from the group consisting of a mineral oil, an ester oil and mixtures thereof.

23. The composition of claim 1 further comprising an aromatic ester oil having the formula $R^1$—(AO)nOOC-Ph-$(R^2)_p$ where $R^1$ is a $C_1$ to $C_{15}$ alkyl group, AO is an alkyleneoxy group which may vary along the (poly)alkyleneoxy chain and Ph is a phenylene group, which may be substituted with groups $(R^2)_p$, where each $R^2$ is independently an alkyl, halogen, haloalky or alkoxy group; n is 0 or at least 1; and p is 0 or from 1 to 3.

24. The composition of claim 1 further comprising an aromatic ester oil selected from the group consisting of isopropyl benzoate, isobutyl benzoate, 2-ethyl hexyl benzoate and mixtures thereof.

25. The composition of claim 1 comprising 0.5% w/w to 1% w/w of a phosphate ester.

26. The composition of claim 1 comprising one or more of an oil, a corrosion inhibitor, a stabilizer, an antioxidant, a biocide, a viscosity modifier, a foam suppressant or a surfactant.

27. The composition of claim 2 comprising one or more of a corrosion inhibitor, a stabilizer, an antioxidant, a biocide, a viscosity modifier or a surfactant.

28. A method of manufacturing a composition comprising the steps of:
 1. providing a block copolymer;
 2. providing a water dispersible esterified trimer acid;
 3. mixing the block copolymer and the water dispersible ester to form a concentrate; and
 4. adding water to form the composition.

29. The method of claim 28 wherein the water dispersible esterified trimer acid is provided by the step of neutralizing an esterified trimer acid with a base.

30. The method of claim 28 further comprising providing a polymeric surfactant antifoaming agent.

31. The method of claim 28 further comprising providing an oil.

32. The metal working fluid of claim 28 further comprising providing a phosphate ester.

* * * * *